(No Model.)

A. WEED.
FILE AND HANDLE.

No. 586,582. Patented July 20, 1897.

Witnesses

Inventor
Alfred Weed
by Faxon Freeman
Attorneys

UNITED STATES PATENT OFFICE.

ALFRED WEED, OF ANDERSON, INDIANA.

FILE AND HANDLE.

SPECIFICATION forming part of Letters Patent No. 586,582, dated July 20, 1897.

Application filed December 28, 1896. Serial No. 617,243. (No model.)

*To all whom it may concern:*

Be it known that I, ALFRED WEED, a citizen of the United States, residing at Anderson, Madison county, State of Indiana, have invented certain new and useful Improvements in Files and Handles, of which the following is a specification.

My invention relates to tool-handles, and while it is adapted for various tools it is especially designed for the purpose of holding files, and I will proceed to describe the construction and arrangement of the device as specially adapted for use in connection with files and rasps, it being understood that whenever I use the term "file" or "rasp" it is intended to include any other equivalent tool or tools to which my invention is applicable.

The object of the invention is to provide a simple, cheap, and effective construction of handle which can readily be applied to files, rasps, and similar tools and which will firmly hold them in place during operation, but permit of their ready detachment from the handle; and to these ends my invention consists in the various features of construction, substantially as hereinafter more particularly pointed out.

Figure 1:
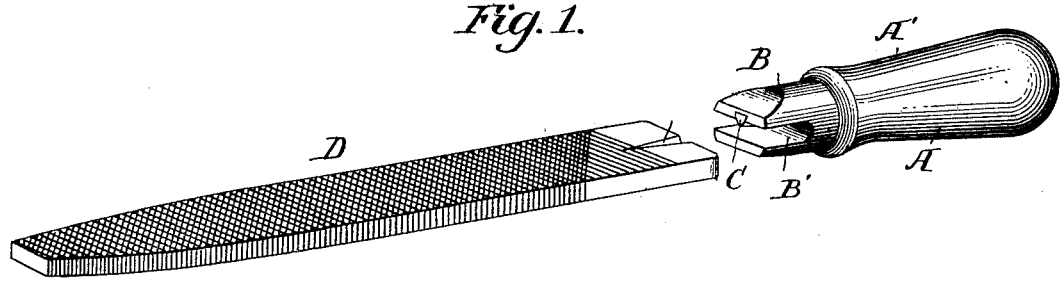
Figure 2:
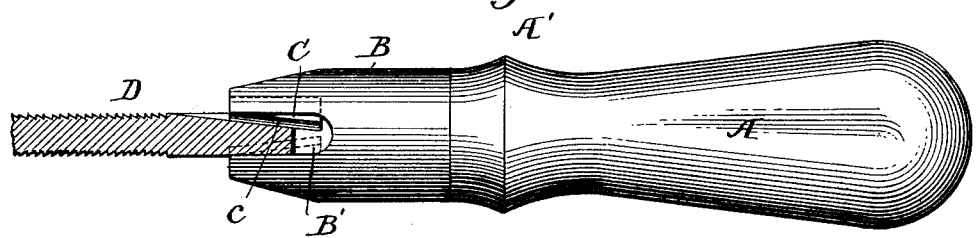
Figure 5:
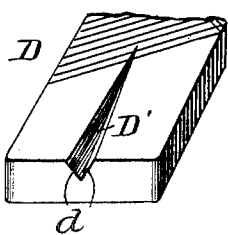
Figure 3:
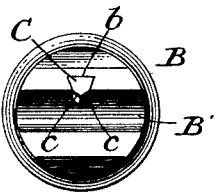
Figure 6:
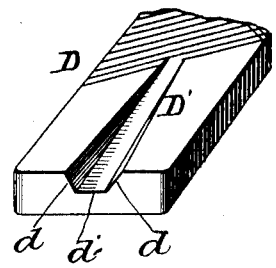
Figure 4:
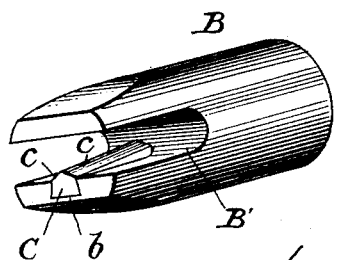

Referring to the accompanying drawings, Figure 1 is a perspective view showing the file or rasp and handle detached. Fig. 2 is a side view, partly in section, on an enlarged scale. Fig. 3 is an end view of the handle. Fig. 4 is a perspective view of the handle. Fig. 5 is a perspective view of the rasp, and Fig. 6 is a similar view showing a slight modification of the invention.

The main object of my invention is to provide a handle which may be readily connected to a file, rasp, or similar tool and which will hold the same in proper relations with the handle while being operated, and which may be readily detached, so that another file or tool can be substituted for use in connection with the handle.

In carrying out my invention I provide a handle A', comprising the hand-receiving portion A, which may be of any material and shape desired, and a ferrule B, which is preferably of metal and is secured to the hand-receiving portion A. This ferrule B is provided with a slot B' in its end for the reception of the file or rasp and is of a size to conveniently receive the same, and is shown as in the form of a transverse slot with parallel sides.

Projecting into the slot from one or both sides thereof is a rib C. This rib has inclined sides c and tapers from the outer toward the inner end. Preferably the lower portion of the inclined sides c is practically coincident with the plane of the side of the slot at the outer portion and gradually rising or increasing toward the inner portion of the slot. In this way I form a sort of double wedge having inclined sides and increasing in thickness from its outer end toward its rear end. This rib may be formed as an integral part of the ferrule B, or, as indicated in Figs. 3 and 4 more particularly, it may be a separate piece having dovetailed sides fitting a recess b in the ferrule.

The file or other tool D to be used in conjunction with this handle is provided with a recess D', having inclined sides d and gradually tapering from the outer end of the file to a point where it merges into the surface of the file, so that it presents a tapering recess having inclined tapering sides. This recess may be formed in one or both sides of the file or tool to correspond with the form of the handle.

In Fig. 6 I have shown a form of file or tool D in which the same feature of construction is embodied, except that the base of the tapering recess is flattened, as at d', so as to furnish a larger bearing-surface to the rib C, but it has the characteristics of the other form of recess in that the base of the recess D' tapers from the outer end to a point where it coincides with the surface of the file, and the sides d are inclined and tapering, as before.

When the handle is to be used in connection with a file or other tool, it is only necessary to bring the parts together so that the rib C will fit in the recess D', and then as the tool is used these parts will be brought more closely together, so that they will be held tightly in position.

It will be observed that owing to the inclined tapering form of the rib having the inclined edges, which engage the similar inclined tapering slot having inclined tapering sides, a positive and substantial bearing is obtained between the parts, which tends to hold them rigidly in position as long as they are in engagement, and there is a relatively large bearing or wearing surface between the surface of the rib and of the recess.

When it is desired to detach the file from the handle, this can be readily done by a slight blow, and another tool or file may be substituted for the one already in use.

This construction is exceedingly simple to make and has been demonstrated to be efficient in practice, and it will be readily observed that the ordinary extension of the file or rasp is dispensed with, saving considerable metal, and the recess occupies a position in the extreme end of the file or rasp which does not in any practical way interfere with the full operation of the device.

What I claim is—

1. A tool-handle provided with a transverse slot having extending into the slot a tapering rib having inclined sides, substantially as described.

2. A tool-handle comprising a ferrule having a transverse slot and having extending into the slot a tapering rib having inclined sides, the said rib being dovetailed into the ferrule, substantially as described.

3. The combination with a tool-handle provided with a transverse slot and having a tapering rib with inclined sides projecting into the slot, of a file provided with a tapering recess having inclined tapering sides, substantially as described.

In testimony whereof I have signed my name to this specification in the presence of two subscribing witnesses.

ALFRED WEED.

Witnesses:
J. W. McNEVIN,
W. R. WERKING.